United States Patent [19]

Kelley

[11] 3,797,032

[45] Mar. 12, 1974

[54] CONSTANT GAP EXTENDED WEAR MAGNETIC TAPE HEAD

[75] Inventor: Jerry O. Kelley, Grass Valley, Calif.

[73] Assignee: Arvin Industries, Inc., Columbus, Ind.

[22] Filed: July 10, 1972

[21] Appl. No.: 270,084

[52] U.S. Cl. .................................... 360/119, 360/125
[51] Int. Cl. ............................................. G11b 5/22
[58] Field of Search ......... 179/100.2 C; 346/74 MC; 340/174.1 F

[56] References Cited

UNITED STATES PATENTS 3,546,398 12/1970 French ......................... 340/174.1 F
3,663,765 5/1972 Schneider ..................... 340/174.1 F
2,592,652 4/1952 Buhrendorf ................. 179/100.2 C

*Primary Examiner*—Bernard Konick
*Assistant Examiner*—Robert S. Tupper
*Attorney, Agent, or Firm*—Biebel, French & Bugg

[57] ABSTRACT

A magnetic transducer for magnetic tape includes a fixed pole member and a movable pole member. The gap surface of the movable pole member is movable toward and away from that of the fixed pole member, and tapers away therefrom at an acute angle. The tape moves along extended surfaces of the pole members to minimize wear adjacent the gap surfaces thereof, and a generally convex surface on the rear of the movable pole member rotates against a surface of the fixed pole member to maintain the gap surfaces in alignment.

9 Claims, 6 Drawing Figures

PATENTED MAR 12 1974 3,797,032

CONSTANT GAP EXTENDED WEAR MAGNETIC TAPE HEAD

BACKGROUND OF THE INVENTION

This invention relates to magnetic tape recording devices, and more particularly to magnetic transducers or heads for recording or playing back a signal on a magnetic tape.

As is well known, the shorter the separation or gap between the pole pieces of a tape recorder head, the higher the potential frequency response of the tape system. However, the closer the pole pieces, the more the magnetic flux can pass directly from one pole piece to the other, without affecting the magnetic tape itself. As a result, greater and greater flux densities and more and more power are required with decreasing gap length.

One solution to this problem has been to use a short effective gap "depth", where gap depth is a measure of the effective area each pole piece presents to the other for carrying magnetic flux therebetween. That is, since the width of the pole pieces is fixed by the width of the tape, the area becomes solely a function of how far away from the tape ("depth" ) the pole faces continue. The less the better.

However, the depth cannot be too shallow since ordinary wear and tear on the pole pieces resulting from frictional movement of the tape therepast will remove enough material to wear the thin edge away and thus increase the gap size. Structural integrity of the pole pieces is also sometimes destroyed by making them too thin, since they cannot withstand the forces of the tape, and suffer partial collapse. The problem is even more acute when dealing with the low permeability materials typical in high frequency applications.

SUMMARY OF THE INVENTION

It is therefore an object of this invention to provide a constant gap extended wear tape transducer or head; a tape head having a very short effective gap depth; a tape head in which the gap depth will be self-maintaining and substantially uniform over extended use and wear; a tape head wherein the effective magnetic gap separation will be substantially constant during flux saturation; a tape head wherein wear adjacent the gap surfaces is minimized; a tape head having considerable mechanical strength between the pole members at the gap; a tape head which will be self-compensating for wear resulting from tape moving therepast, and will automatically maintain the pole pieces in proper alignment; and to accomplish all of the above in an inexpensive, uncomplicated, economical, highly durable, serviceable, and useful configuration readily adapted to a wide variety of magnetic tape transducer applications.

Briefly, one embodiment of this invention includes a fixed pole member and a movable pole member having gap surfaces facing one another. The gap surface on the fixed pole member is substantially perpendicular to the tape path. The gap surface on the movable pole member tapers away at an acute angle from the opposing gap surface on the fixed pole member, the acute angle providing a very short effective gap depth limiting the effective gap separation during flux saturation, and providing considerable mechanical strength.

The tape path against the pole members is defined by extended portions thereof which minimize the wear upon the pole piece in the region of the gap surfaces. An optional non-magnetic gap material may be disposed between the gap surfaces, to strengthen them and to assure the gap dimensions.

The rear of the fixed pole member has a substantially flat surface which receives a generally convex contacting surface on the movable pole member. The contact therebetween maintains a closed flux path around and through the pole members. The shapes of the surfaces cause the movable pole member to rotate relative to the fixed pole member on a path which maintains the gap surfaces in alignment while compensating for wear thereof.

A resilient means urges the movable pole member into contact with the fixed pole member.

DESCRIPTION OF THE PREFERRED EMBODIMENTS

Figure 1:
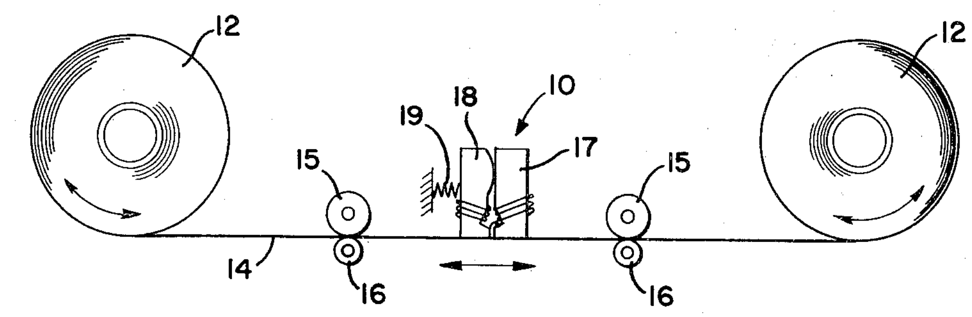
FIG. 1 is a diagrammatic illustration of a tape recorder incorporating the constant gap extended wear magnetic transducer of this invention.

With reference to the drawings, and more particularly to FIG. 1, there is illustrated a magnetic tape recording device employing the constant gap extended wear magnetic transducer or tape head 10 of this invention. The tape recorder includes tape reels 12, which serve as take-up and supply reels for a magnetic tape 14 passed therebetween. Suitable tape drives such as capstans 15 and rollers 16 may be supplied where desired.

A fixed pole member 17 faces a movable pole member 18. The latter is urged toward the former by a resilient biasing means 19, such as a spring. Biasing means 19 is the predominance source of interface pressure between the pole members, the drag of tape 14 being negligible in relation thereto.

The tape 14 moves past pole members 17 and 18 along extended portions 20 and 21 thereof, respectively. Extended portions 20 and 21 distribute the pressure of tape 14, thereby limiting the wear of the tape thereon.

A gap surface 24 on fixed pole member 17 faces a gap surface 25 on movable pole member 18. Gap surface 24 is disposed substantially perpendicularly to the path of tape 14. (FIG. 1. )

Figures 2, 4, 6:
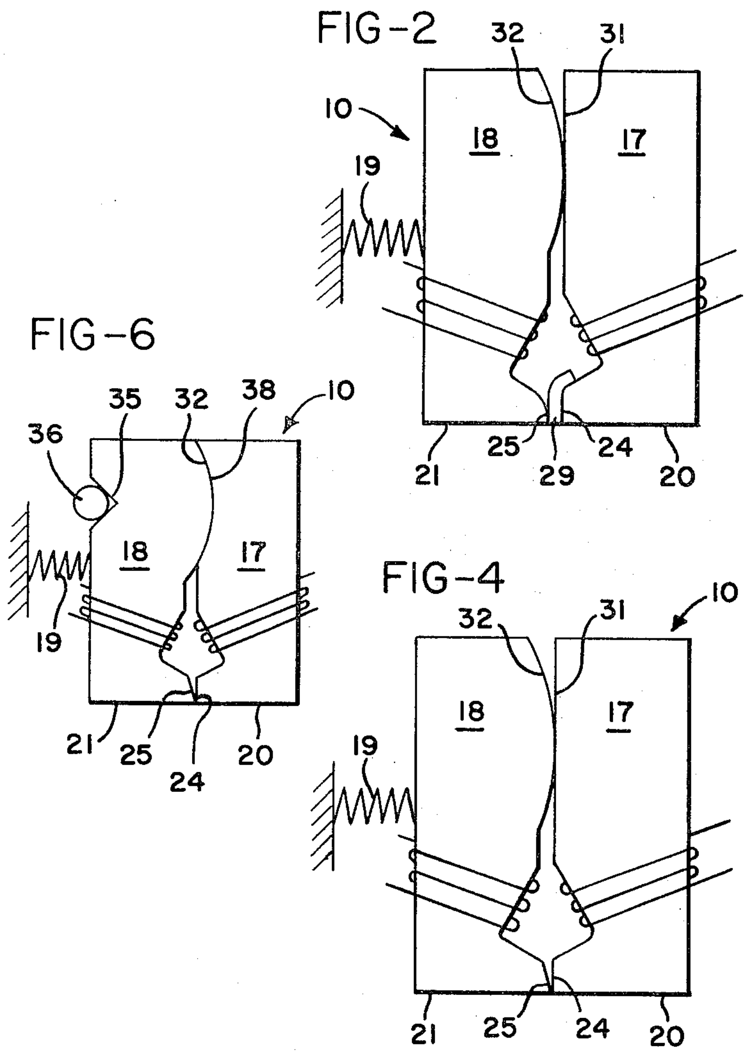
FIG. 2 is an enlarged illustration of the embodiment of this invention as shown in FIG. 1.
FIG. 4 illustrates another embodiment of this invention.
FIG. 6 illustrates a third embodiment of this invention.
Figure 3:
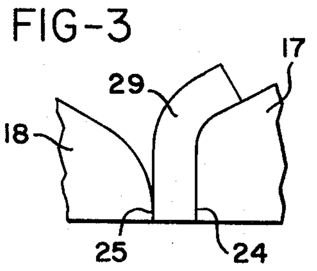
FIG. 3 is an enlarged view of the gap surface region of the FIG. 2 embodiment.
Figure 5:
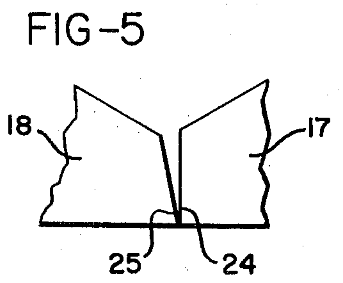
FIG. 5 is an enlarged view of the gap surface region of the FIG. 4 embodiment.

On the other hand, gap surface 25, while substantially adjacent gap surface 24 where they meet tape 14, nevertheless tapers away from surface 24 as it moves farther and farther away from the tape. The angle defined by surfaces 24 and 25 is the angle by which surface 25 tapers away from surface 24, and is quite acute. Where surfaces 24 and 25 are substantially adjacent one another and tape 14, surface 25 is substantially perpendicular to the tape path, or parallel to surface 24. Subsequently, however, it tapers away, as discussed above. In the embodiment of FIG. 2, the perpendicularity adjacent the tape results from the slight curvature of gap surface 25 adjacent the tape. In the FIG. 4 embodiment, although the taper angle of surface 25 would otherwise continue all the way to the tape, the contact between surfaces 24 and 25 flattens surface 25 in the very limited region of contact therebetween. This gives surface 25 a very small region which is substantially perpendicular to the tape near the juncture therewith. The FIG. 4 surfaces 24 and 25 do not "short circuit" the magnetic flux where they contact, however, due to the inevitable irregularities on the surfaces thereof which limit actual contact, during normal conditions, to very small regions.

FIG. 2 illustrates an optional non-magnetic gap material 29 which may be provided between pole members 17 and 18 along surfaces 24 and 25. Gap material 29 helps maintain the proper gap length between the pole members, and provides additional strength therebetween by allowing surface 25 to rest against a greater area without deforming it nor bringing it into contact with fixed pole member surface 24.

The rear of fixed pole member 17 is provided with a substantially flat rear receiving surface 31. A substantially convex rear contacting surface 32 on movable pole member 18 is maintained in contact with surface 31 by resilient biasing means 19. These surfaces maintain a closed flux path around pole members 17 and 18. The shapes of surfaces 31 and 32 also allow surface 32 to roll about surface 31, thus allowing pole member 18 to be movable relative to fixed pole member 17. In addition, surfaces 31 and 32 are so shaped that as pole member 18 wears away along extended portion 21, causing surface 25 to recede slightly, biasing means 19 compensates for that wear by urging member 18 to roll around surfaces 31 and 32 to bring surface 25 once again adjacent surface 24. At the same time, the shapes of surfaces 31 and 32 cooperate to move pole member 18 relative to pole member 17 so as to keep them in proper alignment while the relative movement therebetween is compensating for the wear caused by tape 14.

FIG. 6 illustrates another embodiment of this invention wherein a notch 35 is provided on the rear of movable pole member 18. Notch 35 receives a dowel 36 and pole member 18 rotates about the axis defined by the dowel. The interlock between notch 35 and dowel 36 assures that movable pole member 18 will not move vertically with respect to fixed pole member 17, where vertical movement means movement perpendicular to the tape path.

FIG. 6 also illustrates another type of interlock which performs essentially the same function as that of notch and dowel 35 and 36. In this case the convex rear contacting surface 32 is received in a concave rear receiving surface 38. Either or both of the notch and dowel combination and the convex-concave surface combination may be used to provide a more reliable protection against inter-pole vertical movement than that provided by the frictional interlock of the FIG. 2 and FIG. 4 embodiments. As will be readily appreciated, when both the notch and dowel arrangement and the concave-convex surface arrangement are used, the radii of the curved surface portions should be drawn from the center of the dowel 36.

AS may be seen, therefore, this invention has numerous advantages. The acute angle of separation whereby surface 25 tapers away from surface 24 allows the proper gap length to be maintained with very little compensating movement of movable pole member 18. At the same time, as the edge of surface 25 adjacent surface 24 (FIG. 4) becomes especially thin, the acute angle allows surface 25 to find structural support with only a very slight deformation of the thin edge. The same is true when a gap material 29 is used (FIG. 2) since the thin edge of surface 25 will penetrate only slightly into the gap material before substantial portions of surface 25 are brought into contact with gap material 29, to support surface 25. The sharp edge of surface 25 is thus prevented from cutting through gap material 29.

The very acute angle by which surface 25 tapers away from surface 24 has very little detrimental effect upon the tape head performance, since the importance of the proximity of the opposing pole faces falls off as an exponential function. Hence, a very acute angle is only a little less efficient than a much larger one, since the very proximate regions in both cases are nearly equal and carry most of the flux.

Another very important advantage obtains from the acute angle. As suggested above, most of the flux passes through the portion of surface 25 in the region closest to surface 24, adjacent the junction of surface 25 with tape 14. This area defines the effective gap depth of the tape head, and when the gap is exceptionally thin, either from design or from wear, the thin edge of material carrying most of the flux can easily become saturated thereby. When this occurs the effective gap length increases by the length of the saturated material. In this invention, however, the very acute angle of separation makes any increase in gap length caused by saturation quite negligible. This result follows because even a modest increase in the gap length, represented by a penetration beneath surface 25, will result in a very much larger cross sectional area of gap surface 25 being presented to conduct the flux, due to the steep rise of that surface. Hence, the low departure angle effectively negates the problem of saturation in a short gap depth tape head during periods of high flux.

With the design of this invention, very considerable interface pressures are also made possible. These pressures may be considerably greater than the contacting region between surfaces 24 and 25 would normally support, since even slight deformation of the contacting regions brings very much larger areas into supporting contact. This allows the movement of the tape past the tape head transducer to be bi-directional, and also allows the pole members 17 and 18 to be frictionally interlocked along surfaces 31 and 32. The frictional interlock vastly simplifies the problem of mounting pole members 17 and 18 adjacent one another since separate pivots or other complicated structural supporting members are rendered unnecessary. The bi-directional capability of the transducer of this invention is further enhanced, as discussed earlier, by extended portions 20 and 21, which equalize the wear of tape 14 against members 17 and 18 regardless of the direction of the movement of the tape.

While the forms of apparatus herein described constitute preferred embodiments of this invention, it is to be understood that the invention is not limited to these precise forms of apparatus, and that changes may be made therein without departing from the scope of the invention.

What is claimed is:

1. A magnetic transducer for magnetic tape movable along a deffined path, comprising:

a. a fixed pole member adapted to receive magnetic tape thereagainst, b. a first gap surface on said fixed pole member adjacent and substantially perpendicular to the tape path, c. a movable pole member adjacent said fixed pole member and adapted to interface with the magnetic tape, d. a second gap surface on said movable pole member opposite and movable toward and away from said first gap surface, said second gap surface being adjacent the tape and substantially perpendicular thereto near the junction therewith, said second gap surface tapering away from said first gap surface at an acute angle to limit the effective magnetic gap separation during flux saturation, and e. a means urging said movable pole member toward said fixed pole member.

2. The transducer of claim 1 further comprising a non-magnetic gap material disposed between said first and said second gap surfaces to maintain a predetermined gap dimension.

3. The transducer of claim 1 wherein said pole members receive the tape against extended portions thereof to minimize wear adjacent the gap surfaces when the tape is moved therepast.

4. The transducer of claim 1 further comprising:

a. a rear receiving surface on said fixed pole member for receiving said movable pole member in contacting relation, and b. a rear contacting surface on said movable pole member in contact with said receiving surface and having a curvature thereon allowing said movable member to rotate against said fixed member while maintaining said gap surfaces in alignment and while maintaining a closed flux path between said rear surfaces.

5. The transducer of claim 4 wherein said rear receiving surface is substantially flat and said rear contacting surface is generally convex.

6. The transducer of claim 4 further comprising a means for preventing vertical movement between said pole members.

7. The transducer of claim 4 wherein said pole members receive the tape against extended portions thereof to minimize wear adjacent the gap surfaces when the tape is moved therepast.

8. A magnetic transducer for magnetic tape movable along a defined path, comprising:

a. a fixed pole member adapted to receive magnetic tape against an extended portion thereof, b. a first gap surface on said fixed pole member adjacent and substantially perpendicular to the tape path, c. a movable pole member adjacent said fixed pole member and adapted to interface with the magnetic tape and to receive the tape against an extended portion thereof, d. a second gap surface on said movable pole member opposite and movable toward and away from said first gap surface, said second gap surface being adjacent the tape and substantially perpendicular thereto near the junction therewith, said second gap surface tapering away from said first gap surface at an acute angle to limit the effective magnetic gap separation during flux saturation, the extended portions of said pole members minimizing wear adjacent the gap surfaces when the tape is moved therepast, e. a substantially flat rear receiving surface on said fixed pole member for receiving said movable pole member in contacting relation, f. a generally convex rear contacting surface on said movable pole member in contact with said receiving surface and having a curvature thereon allowing said movable member to rotate against said fixed member while maintaining said gap surfaces in alignment and while maintaining a closed flux path between said rear surfaces, and g. a means urging said movable pole member toward said fixed pole member.

9. The transducer of claim 8 further comprising a non-magnetic gap material disposed between said first and said second gap surfaces to maintain a predetermined gap dimension.

* * * * *